(12) United States Patent
Bookbinder et al.

(10) Patent No.: US 11,945,748 B2
(45) Date of Patent: *Apr. 2, 2024

(54) ION EXCHANGEABLE GLASS WITH DEEP COMPRESSIVE LAYER AND HIGH DAMAGE THRESHOLD

(71) Applicant: CORNING INCORPORATED, Corning, NY (US)

(72) Inventors: Dana Craig Bookbinder, Corning, NY (US); Timothy Michael Gross, Painted Post, NY (US); Marcel Potuzak, Rejstejn (CZ)

(73) Assignee: CORNING INCORPORATED, Corning, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/411,464

(22) Filed: Aug. 25, 2021

(65) Prior Publication Data
US 2021/0380470 A1 Dec. 9, 2021

Related U.S. Application Data

(63) Continuation of application No. 16/004,963, filed on Jun. 11, 2018, now Pat. No. 11,124,443, which is a
(Continued)

(51) Int. Cl.
*C03C 21/00* (2006.01)
*C03C 3/062* (2006.01)
(Continued)

(52) U.S. Cl.
CPC .............. *C03C 3/097* (2013.01); *C03C 3/062* (2013.01); *C03C 3/064* (2013.01); *C03C 21/002* (2013.01); *Y10T 428/264* (2015.01)

(58) Field of Classification Search
None
See application file for complete search history.

(56) References Cited

U.S. PATENT DOCUMENTS 3,357,876 A 12/1967 Dale
3,481,726 A 12/1969 Fischer et al.
(Continued)

FOREIGN PATENT DOCUMENTS

EP 2263979 A1 12/2010
EP 2609047 A1 7/2013
(Continued)

OTHER PUBLICATIONS

Aboud et al., "Crystallization behavior in the glass system SiO 2-P2 O5-A12 O 3-MgO—Na 20", J.Non-Cryst.Solids, 1997, vol. 219, p. 149-154.
(Continued)

*Primary Examiner* — David Sample

(57) ABSTRACT

Glasses comprising $SiO_2$, $Al_2O_3$, and $P_2O_5$ that are capable of chemical strengthened by ion exchange and having high damage resistance. These phosphate-containing glasses have a structure in which silica ($SiO_2$) is replaced by aluminum phosphate ($AlPO_4$) and/or boron phosphate ($BPO_4$).

9 Claims, 5 Drawing Sheets

Related U.S. Application Data continuation of application No. 15/152,020, filed on May 11, 2016, now Pat. No. 10,017,412, which is a continuation of application No. 13/305,271, filed on Nov. 28, 2011, now Pat. No. 9,346,703.

(60) Provisional application No. 61/417,941, filed on Nov. 30, 2010.

(51) Int. Cl.
*C03C 3/064* (2006.01)
*C03C 3/097* (2006.01)

(56) References Cited

U.S. PATENT DOCUMENTS

| | | | |
|---|---|---|---|
| 3,485,647 A | 12/1969 | Roy, V | |
| 3,844,754 A | 10/1974 | Grubb et al. | |
| 3,876,436 A | 4/1975 | Lythgoe | |
| 3,907,577 A | 9/1975 | Kiefer et al. | |
| 4,042,405 A | 8/1977 | Krohn et al. | |
| 4,055,703 A | 10/1977 | Rinehart | |
| 4,092,174 A | 5/1978 | Ellis et al. | |
| 4,108,674 A | 8/1978 | Gliemeroth | |
| 4,508,834 A | 4/1985 | Gliemeroth et al. | |
| 4,726,981 A | 2/1988 | Pierson et al. | |
| 6,376,402 B1 | 4/2002 | Pannhorst et al. | |
| 6,518,211 B1 | 2/2003 | Bradshaw et al. | |
| 7,727,917 B2 | 6/2010 | Shelestak et al. | |
| 8,283,060 B2 | 10/2012 | Yagi et al. | |
| 8,586,492 B2 | 11/2013 | Barefoot et al. | |
| 8,759,238 B2 | 6/2014 | Chapman et al. | |
| 8,778,820 B2 | 7/2014 | Gomez et al. | |
| 9,346,703 B2 | 5/2016 | Bookbinder et al. | |
| 9,540,278 B2 | 1/2017 | Chapman et al. | |
| 10,017,412 B2 | 7/2018 | Bookbinder et al. | |
| 11,124,443 B2 * | 9/2021 | Bookbinder | C03C 21/002 |
| 2005/0090377 A1 | 4/2005 | Shelestak et al. | |
| 2007/0135291 A1 | 6/2007 | Bernard et al. | |
| 2010/0035745 A1 | 2/2010 | Murata | |
| 2010/0047521 A1 | 2/2010 | Amin et al. | |
| 2010/0215993 A1 | 8/2010 | Yagi et al. | |
| 2010/0215996 A1 | 8/2010 | Wendling et al. | |
| 2011/0201490 A1 | 8/2011 | Barefoot et al. | |
| 2011/0294648 A1 | 12/2011 | Chapman et al. | |
| 2012/0052271 A1 | 3/2012 | Gomez et al. | |
| 2013/0136909 A1 | 5/2013 | Mauro et al. | |
| 2013/0288001 A1 | 10/2013 | Murata et al. | |
| 2014/0308526 A1 | 10/2014 | Chapman et al. | |

FOREIGN PATENT DOCUMENTS

| | | |
|---|---|---|
| JP | 07-263318 A | 10/1995 |
| JP | 2000-327365 A | 11/2000 |
| JP | 2001-026441 A | 1/2001 |
| JP | 2011-057504 A | 3/2011 |
| WO | 2008/044694 A1 | 4/2008 |
| WO | 2010/131659 A1 | 11/2010 |
| WO | 2011/103798 A1 | 9/2011 |
| WO | 2012/027660 A1 | 3/2012 |
| WO | 2012/074949 A1 | 6/2012 |

OTHER PUBLICATIONS

Aleixandre et al., "Changes in the physical properties of borophosphate glasses from adding ZrO2, SiO54Zr and BaO" Silicates Industriels, 1961, vol. 26, No. 10, p. 467.

Berneschi et al., "Aluminum co-doping of soda-lime silicate glasses: Effect on optical and spectroscopic properties", J. Non-Cryst.Solids, 2005, vol. 351, No. 21-23, p. 1747.

Berneschi et al., "Optical and spectroscopic properties of soda-lime alumino silicate glasses doped with Er3+ and/or Yb3+" Optical Materials, 2006, vol. 28, No. 11, p. 1271-1275.

Bourhis, "Glass: Mechanics and Technology", Wiley. p. 170-174 XP007920266.

Corradi et al., "Influence of Al2O3 addition on thermal and structural properties of erbium doped glasses", J.Mater.Sci., 2006, vol. 41, No. 10, p. 2811.

Drexler et al., "Aluminum Orthophosphate Glasses", Glastechnische Berichte, 1951, vol. 24, No. 7, p. 172-176.

English Translation of CN201180057659.5 Notice of Fourth Office Action dated Nov. 14, 2016; 8 pages; Chinese Patent Office.

Greaves et al; "Inorganic Glasses, glass-forming liquids and amorphizing solids" Advances in Physics; vol. 56, No. 1; 2007 pp. 1-166.

Hampshire, "Oxynitride glasses, their properties and crystallisation—a review", Journal of Non-Crystalline Solids 316 (2003) p. 64-73.

International Search Report and Written Opinion of the International Searching Authority; PCT/US2011/062288; dated Feb. 28, 2012, 9 pages; European Patent Office.

Japanese Patent Application No. 2018228326; Machine Translation of the Office Action dated Oct. 23, 19; Japan Patent Office; 4 Pgs. JP2013542086 Office Action dated Jan. 13, 2016.

Smedskjaer "Effect of thermal history and chemical composition on hardness of silicate glasses"; Journal of Non-Crystalline Solids 356 (2010); pp. 893-897.

Toplis et al. A P MAS NMR study of glasses in the system xNa2O-(1-x)Al2O3-2SiO2-yP2O5, Journal of Non-Crystalline Solids, NL, Elsevier Science B.V. Feb. 1998, 224(1) pp. 57-68, ISSn:0022-3093.

Toplis et al., "The variable influence of P2O5 on the viscosity of melts of differing alkali/aluminium ratio: Implications for the structural role of phosphorus in silicate melts", Geochim.Cosmochim. Acta, 1996, vol. 60, No. 21, p. 4107-4121.

Varshneya, "Fundamentals of Inorganic Glasses", 10 pgs. XP002563094.

* cited by examiner

ION EXCHANGEABLE GLASS WITH DEEP COMPRESSIVE LAYER AND HIGH DAMAGE THRESHOLD

CROSS REFERENCE TO RELATED APPLICATIONS

This application is a continuation of U.S. patent application Ser. No. 16/004,963 filed on Jun. 11, 2018, which is a continuation of U.S. patent application Ser. No. 15/152,020 filed on May 11, 2016, which is a continuation of U.S. patent application Ser. No. 13/305,271 filed on Nov. 28, 2011, which claims the benefit of priority under 35 U.S.C. § 119 of U.S. Provisional Application Ser. No. 61/417,941, filed on Nov. 30, 2010, the content of which is relied upon and incorporated herein by reference in its entirety.

BACKGROUND

The disclosure relates to glasses that are damage resistant. More particularly, the disclosure relates to damage resistant phosphate-containing glasses. Even more particularly, the disclosure relates to damage resistant phosphate-containing glasses that are strengthened by ion exchange.

In many applications, glasses are chemically strengthened by ion exchange, which forms a compressive surface layer in the glass. This layer is resistant to the propagation of cracks due impact. Further damage resistance may be provided through the inclusion of boron as $B_2O_3$ in the composition.

SUMMARY

Glasses comprising $SiO_2$, $Al_2O_3$, and $P_2O_5$ that are capable of chemical strengthening by ion exchange and having high damage resistance are provided. These phosphate-containing glasses have a structure in which silica ($SiO_2$) in the glass is replaced by aluminum phosphate ($AlPO_4$), which consists of tetrahedrally coordinated aluminum and phosphorus and/or replaced by boron phosphate ($BPO_4$), which consists of tetrahedrally coordinated boron and phosphorus. The glasses inherently have Vickers crack initiation (i.e., median and/or radial crack initiation) thresholds of at least 500 gf (gram force). When strengthened by ion exchange, the glasses have Vickers damage resistance thresholds of at least about 10 kgf (kilogram force).

Accordingly, one aspect of the disclosure is to provide a glass. The glass comprises $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.3$, where $M_2O_3 = Al_2O_3 + B_2O_3$.

A second aspect of the disclosure is to provide a glass. The glass comprises $SiO_2$, $Al_2O_3$, $P_2O_5$, and at least one alkali metal oxide ($R_2O$), wherein $0.75 \leq [(P_2O_5 \text{ (mol \%)} + R_2O \text{ (mol \%)})/M_2O_3 \text{ (mol \%)}] \leq 1.3$, where $M_2O_3 = Al_2O_3 + B_2O_3$, and wherein the glass, when ion exchanged, has a Vickers median/radial crack initiation threshold of at least about 10 kgf.

These and other aspects, advantages, and salient features will become apparent from the following detailed description, the accompanying drawings, and the appended claims.

DETAILED DESCRIPTION

Figure 1:
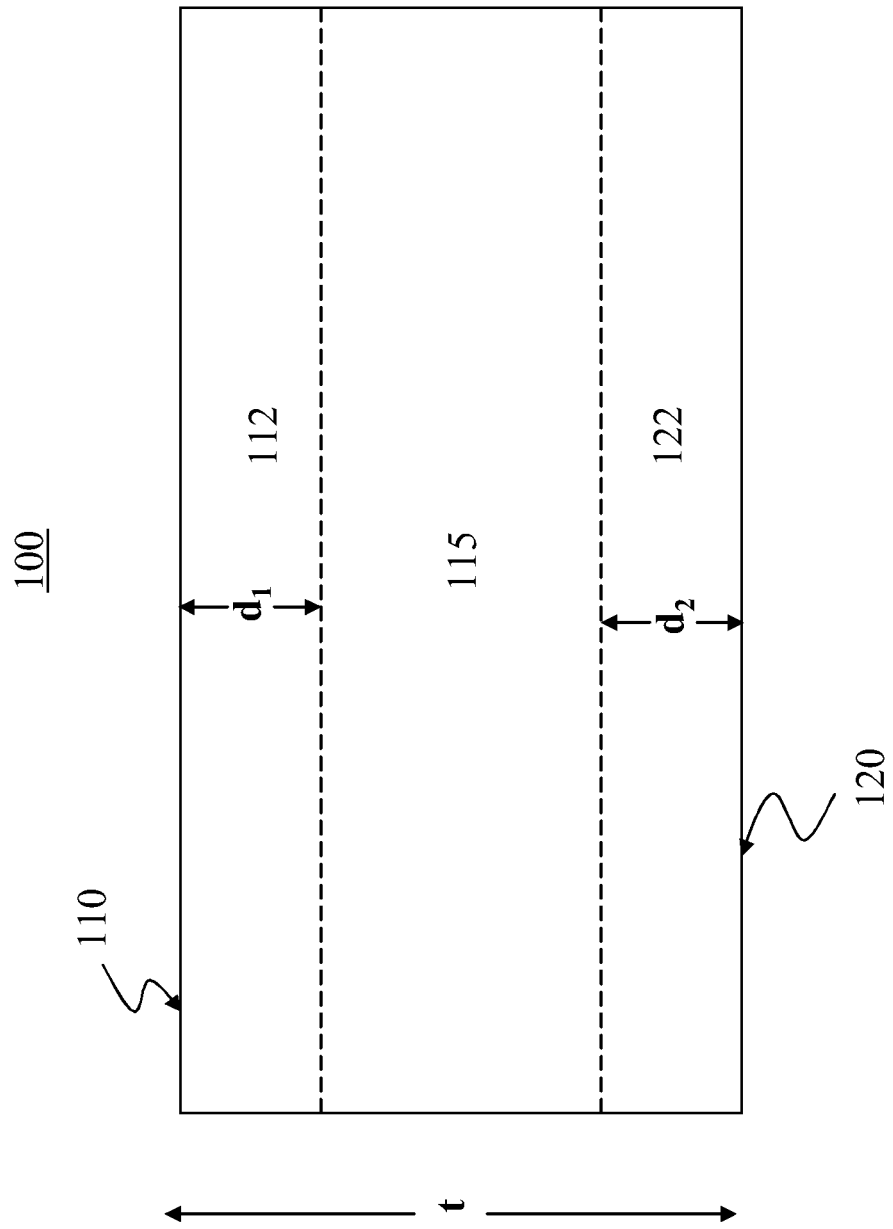
FIG. 1 is a schematic cross-sectional view of a glass sheet strengthened by ion exchange.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" mean "at least one" or "one or more," unless otherwise specified.

As described herein, the Vickers indenter that is used to measure crack initiation is known in the art and described, for example, in pages 130-132 of "Materials Science and Engineering (third edition)" by William D. Callister (John Wiley & Sons, New York, 1994), which are incorporated by reference herein. Unless otherwise specified, the Vickers indentation cracking threshold measurements described herein are performed by applying and then removing an indentation load to the glass surface at 0.2 mm/min. The indentation maximum load is held for 10 seconds. The indentation cracking threshold is defined at the indentation load at which greater than 50% of 10 indents exhibit any number of radial/median cracks emanating from the corners of the indent impression. The maximum load is increased until the threshold is met for a given glass composition. All indentation measurements are performed at room temperature in 50% relative humidity.

As described herein, abraded ring-on-ring failure loads obtained for glass samples was determined by first blasting the surface of the sample to be studied (typical dimensions are 50 mm×50 mm×0.7 mm thick) with 90 grit silicon carbide (SiC) at a pressure of 5 psi for five seconds. Samples are masked so that the abrasion is limited to a 6 mm diameter circle located at the center of the 50 mm×50 mm faces of the sample. Abrasion of the samples was followed by ring-on-ring load-to failure-testing with a 1 inch diameter support ring and a ½ inch diameter loading ring. The sample is placed on the support ring with the abraded side face down, so as to put the abraded region in tension during testing. The load is applied at a rate of 1.2 mm/min. Testing is performed at room temperature in 50% relative humidity. The radius of curvature on the rings is 1/16 inch.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glasses designed for use in applications such as in consumer electronics, automotive applications, appliances, architectural components, and other areas where high levels of damage resistance are desirable are frequently strengthened by thermal means (e.g., thermal tempering) or chemical means. Ion exchange is widely used to chemically strengthen glass articles for such applications. In this process, a glass article containing a first metal ion (e.g., alkali cations in $Li_2O$, $Na_2O$, etc.) is at least partially immersed in or otherwise contacted with an ion exchange bath or medium containing a second metal ion that is either larger or smaller than the first metal ion that is present in the glass. The first metal ions diffuse from the glass surface into the ion exchange bath/medium while the second metal ions from the ion exchange bath/medium replace the first metal ions in the glass to a depth of layer below the surface of the glass. The substitution of larger ions for smaller ions in the glass creates a compressive stress at the glass surface, whereas substitution of smaller ions for larger ions in the glass typically creates a tensile stress at the surface of the glass. In some embodiments, the first metal ion and second metal ion are monovalent alkali metal ions. However, other monovalent metal ions such as $Ag^+$, $Tl^+$, $Cu^+$, and the like may also be used in the ion exchange process.

A cross-sectional view of a portion (i.e., ends of the glass sheet are not shown) of a glass sheet strengthened by ion exchange is schematically shown in FIG. 1. In the non-limiting example shown in FIG. 1, strengthened glass sheet 100 has a thickness t, central portion 115, and a first surface 110 and second surface 120 that are substantially parallel to each other. Compressive layers 112, 122 extend from first surface 110 and second surface 120, respectively, to depths of layer $d_1$, $d_2$ below each surface. Compressive layers 112, 122 are under a compressive stress, while central portion 115 is under a tensile stress, or in tension. The tensile stress in central portion 115 balances the compressive stresses in compressive layers 112, 122, thus maintaining equilibrium within strengthened glass sheet 100. Whereas a glass sheet having compressive layers 112, 122 extending from opposite surfaces 110, 120 is shown in FIG. 1, the glass described herein can have a single surface that is strengthened by ion exchange, rather than multiple strengthened surfaces 110, 120. This can be achieved, for example, by masking one of surfaces 110, 120 during ion exchange process.

In order to increase damage resistance, boron is sometimes added to glasses as $B_2O_3$. However, the presence of $B_2O_3$ may impede the strengthening of glasses by ion exchange. It has been discovered that addition of phosphorous to the glass as $P_2O_5$ improves damage resistance and does not impede ion exchange. The addition of phosphorous to the glass creates a structure in which silica ($SiO_2$ in the glass) is replaced by aluminum phosphate ($AlPO_4$), which consists of tetrahedrally coordinated aluminum and phosphorus and/or boron phosphate ($BPO_4$), which consists of tetrahedrally coordinated boron and phosphorus. As described herein, ion exchangeable phosphate-containing glasses, as well as phosphate-containing glasses that are chemically strengthened by ion exchange and having high damage resistance, are provided. These glasses comprise $SiO_2$, $Al_2O_3$, $P_2O_5$, and at least one alkali metal oxide ($R_2O$, where R is Li, Na, K, Rb, and/or Cs), wherein $0.75 \leq [(P_2O_5 \text{ (mol \%)} + R_2O \text{ (mol \%)})/M_2O_3 \text{ (mol \%)}] \leq 1.3$, where $M_2O_3 = Al_2O_3 + B_2O_3$. In some embodiments, $[(P_2O_5 \text{ (mol \%)} + R_2O \text{ (mol \%)})/M_2O_3 \text{ (mol \%)}] = 1$. In some embodiments, the glass does not include $B_2O_3$ and $M_2O_3 = Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises, in some embodiments: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO. Exemplary compositions of the glasses, expressed in mol %, are listed in Table 1. The $M_2O_3$ content (where $M_2O_3 = Al_2O_3 + B_2O_3$), combined $P_2O_5 + R_2O$ concentration, $(P_2O_5 + R_2O)/M_2O_3$ ratio, and $(P_2O_5 + R_2O)/Al_2O_3$ ratio of these compositions are also listed in Table 1.

In one aspect, the phosphate-containing glasses described herein have a structure in which silica ($SiO_2$) in the glass is replaced by aluminum phosphate ($AlPO_4$), which consists of tetrahedrally coordinated aluminum and phosphorus. Table 1 lists the equivalent concentrations of $AlPO_4$ units in the glass for compositions given in the table. In such embodiments, the glass compositions described herein follow the rule that $Al_2O_3 = P_2O_5 + R_2O$, where $Al_2O_3$, $P_2O_5$, and $R_2O$ are compositions expressed in mol %. When such conditions exist within the glass, aluminum will nominally be in the form of either tetrahedral aluminum. The phosphorus and/or alkalis charge compensate aluminum ions so that they have the equivalent of a 4+ charge.

In another aspect, the phosphate-containing glasses described herein have a structure in which silica ($SiO_2$) is replaced by boron phosphate ($BPO_4$) in the glass. In such embodiments, the glass compositions described herein follow the rule that $Al_2O_3 = R_2O$ and $B_2O_3$, $= P_2O_5$, where $Al_2O_3$, $B_2O_3$, $P_2O_5$, and $R_2O$ are compositions expressed in mol %. When such conditions exist within the glass, boron will nominally be in the form tetrahedral boron phosphate or tetrahedral boron oxide.

In glasses such as those described herein, each alkali metal ion is capable of creating one non-bridging oxygen (NBO). The unit positive charge on an alkali metal ion can be satisfied by an ionic bond to an oxygen in the silicate glass network. This is accomplished by breaking a bridge between adjacent structural units, while donating an oxygen from the $R_2O$ unit. NBOs reduce the connectivity of the glass network. When $Al_2O_3$ and/or $B_2O_3$ are added to the glass, the alkali metal ions will charge compensate for the $Al^{3+}$ and/or $B^{3+}$ ions and allow these ions to form tetrahedral structural units. The oxygen supplied by the $R_2O$ units is consumed to form these tetrahedra. Each added aluminum or boron ion will remove one NBO from the glass network. If mol % $Al_2O_3$ + mol % $B_2O_3$ = mol % $R_2O$, the structure should not contain any NBOs and should be fully linked. Alkalis are preferentially consumed by aluminum over boron. The remaining alkalis convert trigonal boron to tetrahedral boron until $[Na_2O \text{ (mol \%)} / B_2O_3 \text{ (mol \%)}] > 0.5$. Accordingly, the glasses described herein are substantially free of NBOs when the above equation is satisfied. Because $AlPO_4$ and/or $BPO_4$ are substituted for silica in the glass, the amount of silica in the glasses described herein is lower than in other ion exchangeable glasses.

The phosphate-containing glasses described herein are inherently resistant to damage; i.e., they are damage-resistant in the absence of any thermal or chemical strengthening such as, for example, ion exchange. The phosphate-containing glasses described herein have Vickers indentation damage (crack initiation load) thresholds of at least about 500 gf (gram force) and, in some embodiments, at least about 1000 gf. Vickers indentation cracking thresholds measured for selected prior to strengthening by ion exchange are listed in Table 1.

In some embodiments, the phosphate-containing glasses described herein have molar volumes of at least about 29 $cm^3$/mol, in other embodiments, at least about 30 $cm^3$/mol, and in still other embodiments at least about 32 $cm^3$/mol. Molar volumes of selected glass compositions are listed in Table 1.

Figure 2:
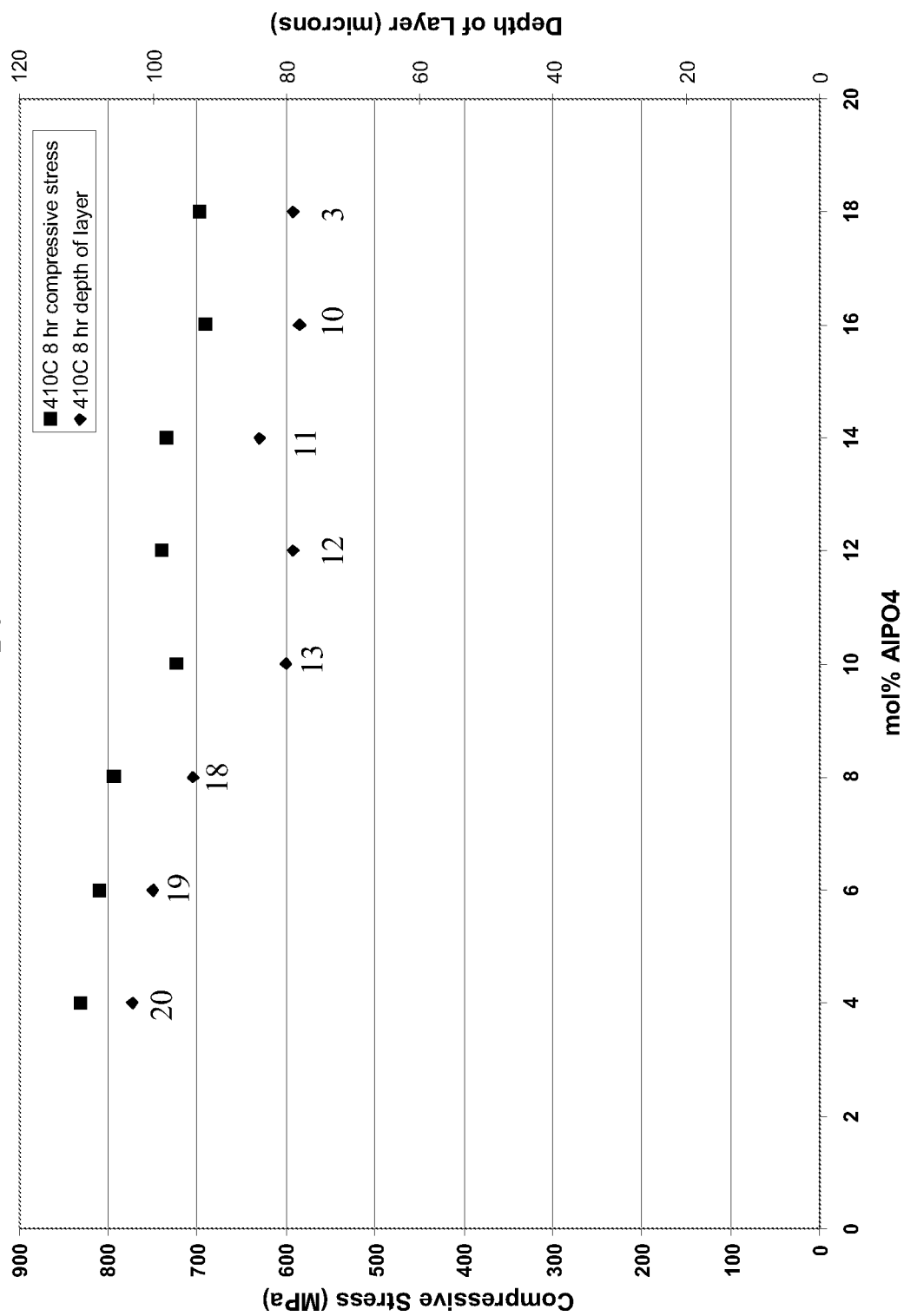
FIG. 2 is a plot of compressive stress and depth of layer as functions of $AlPO_4$ concentration for 0.7 mm thick phosphate-containing glass samples that were ion exchanged in a molten $KNO_3$ salt bath at 410° C. for 8 hours.

The phosphate-containing glasses described herein are also ion exchangeable to a greater depth of compressive layer (depth of layer $d_1$, $d_2$ in FIG. 1) below the surface of the glass than soda lime, alkali aluminosilicate, and alkali aluminoborosilicate glasses. The depth of the compressive layer (112, 122 in FIG. 1) has been shown to be a critical factor in crack resistance of cover glasses for portable electronic devices during system level drop tests. In some embodiments, the phosphate-containing glasses are ion exchangeable to a depth of layer of at least 40 µm and, in other embodiments, to a depth of layer of at least about 60 µm. Compressive stresses and depths of layer obtained by ion exchange in a molten $KNO_3$ salt bath at 410° C. for 8 hours of 0.7 mm thick phosphate-containing glasses (samples 3, 10-13, and 18-20 in Tables 1-3) described herein are plotted as functions of $AlPO_4$ concentration in FIG. 2. Each of the samples plotted in FIG. 2 contain no boron and have $(P_2O_5+R_2O)/M_2O_3$ and $(P_2O_5+R_2O)/Al_2O_3$ ratios that are equal to 1. The depth of layer of the compressive surface layer is at least 78 µm and the compressive stress is at least 692 MPa, as determined by photoelastic methods known in the art. Compressive stresses and depths of layer obtained by ion exchange in a molten $KNO_3$ salt bath at 410° C. for 8 hours of phosphate-containing glasses described herein, as well as Vickers indentation crack initiation loads and abraded ring-on-ring failure load for various $P_2O_5$ containing glasses are listed in Table 2. In one non-limiting example, a depth of compressive layer of 64 µm is achieved when 0.7 mm thick samples of the phosphate-containing glasses described herein are ion-exchanged in a molten $KNO_3$ salt bath at 410° C. for 10 hours, whereas a depth of compressive layer of 56 µm is achieved when alkali aluminosilicate glass samples that do not comprise $P_2O_5$ and having the same thickness undergo ion exchange under the same conditions. When ion exchanged in a molten $KNO_3$ salt bath at 410° C. for 8 hours, 0.7 mm thick samples of the phosphate-containing glasses described herein have a depth of compressive layer of at least about 60 µm and compressive stress of greater than about 600 MPa. In comparison, 0.7 mm thick samples of alkali aluminosilicate glasses that do not comprise $P_2O_5$ ion exchange to a compressive depth of layer of 50 µm under the same conditions.

In addition, ion exchange proceeds more quickly in the phosphate-containing glasses described herein than in those glasses where the expression $0.75 \leq [(P_2O_5 \text{ (mol \%)}+R_2O \text{ (mol \%)})/M_2O_3 \text{ (mol \%)}] \leq 1.3$ is not satisfied. In some embodiments, the phosphate-containing glasses described herein, when ion-exchanged for 2 hours at 410° C. in a molten $KNO_3$ salt bath, are capable of ion exchange to a depth of layer extending to at least about 30 µm from a surface of the glass. Compressive stresses and depths of layer of phosphate-containing glasses described herein, obtained by ion exchange in a molten $KNO_3$ salt bath at 410° C. for 2 hours, as well as Vickers indentation crack initiation loads are listed in Table 2.

TABLE 1

Compositions of phosphorus-containing glasses

| | Sample | | | | | | | | | |
|---|---|---|---|---|---|---|---|---|---|---|
| | 1 | 2 | 3 | 4 | 5 | 6 | 7 | 8 | 9 | 10 |
| | | | | | mol % | | | | | |
| $SiO_2$ | 46 | 48 | 50 | 44 | 42 | 49 | 52 | 43 | 40 | 52 |
| $B_2O_3$ | 4 | 2 | 0 | 6 | 8 | 4 | 4 | 4 | 4 | 0 |
| $Al_2O_3$ | 25 | 25 | 25 | 25 | 25 | 23.5 | 22 | 26.5 | 28 | 24 |
| $P_2O_5$ | 9 | 9 | 9 | 9 | 9 | 7.5 | 6 | 10.5 | 12 | 8 |
| $Na_2O$ | 14 | 14 | 14 | 14 | 14 | 14 | 14 | 14 | 14 | 14 |
| $K_2O$ | 2 | 2 | 2 | 2 | 2 | 2 | 2 | 2 | 2 | 2 |
| $SnO_2$ | 0 | 0 | 0 | 0 | 0 | 0 | 0 | 0 | 0 | 0 |
| $AlPO_4$ equivalent | 18 | 18 | 18 | 18 | 18 | 15 | 12 | 21 | 24 | 16 |
| $BPO_4$ equivalent | | | | | | | | | | |
| $M_2O_3$ | 29 | 27 | 25 | 31 | 33 | 27.5 | 26 | 30.5 | 32 | 24 |
| $P_2O_5 + R_2O$ | 25 | 25 | 25 | 25 | 25 | 23.5 | 22 | 26.5 | 28 | 24 |
| $(P_2O_5 + R_2O)/M_2O_3$ | 0.86 | 0.93 | 1.00 | 0.81 | 0.76 | 0.85 | 0.85 | 0.87 | 0.88 | 1.00 |
| $(P_2O_5 + R_2O)/Al_2O_3$ | 1.00 | 1.00 | 1.00 | 1.00 | 1.00 | 1.00 | 1.00 | 1.00 | 1.00 | 1.00 |
| Molar Volume ($cm^3$/mol) | 33.30 | 32.97 | 32.73 | 33.46 | 33.58 | 32.46 | 31.59 | 33.98 | 34.76 | 32.23 |
| Pre-IX Vickers Crack Initiation Load (gf) | 500-1000 | 1000-2000 | 1000-2000 | 1000-2000 | 1000-2000 | 1000-2000 | 1000-2000 | 1000-2000 | 1000-2000 | 1000-2000 |
| Anneal Pt. (° C.) | 652 | 698 | 739 | 614 | 572 | 661 | 667 | 650 | 645 | 748 |
| Strain Pt. (° C.) | 593 | 637 | 675 | 559 | 521 | 602 | 607 | 593 | 589 | 683 |
| Temperature at Visc = 35 kP (° C.) | 1187 | 1232 | 1276 | 1142 | 1097 | 1206 | 1226 | 1167 | 1147 | 1289 |
| Temperature Zircon Breakdown (° C.) | | | | | | | | | | |
| Liquidus Viscosity (poise) | | | | | | | | | | |

TABLE 1-continued

Compositions of phosphorus-containing glasses

| | Sample | | | | | | | | | |
|---|---|---|---|---|---|---|---|---|---|---|
| | 11 | 12 | 13 | 14 | 15 | 16 | 17 | 18 | 19 | 20 |
| | | | | mol % | | | | | | |
| $SiO_2$ | 54 | 56 | 58 | 50 | 50 | 50 | 50 | 60 | 62 | 64 |
| $B_2O_3$ | 0 | 0 | 0 | 0 | 0 | 0 | 0 | 0 | 0 | 0 |
| $Al_2O_3$ | 23 | 22 | 21 | 27 | 23 | 25 | 25 | 20 | 19 | 18 |
| $P_2O_5$ | 7 | 6 | 5 | 7 | 11 | 9 | 9 | 4 | 3 | 2 |
| $Na_2O$ | 14 | 14 | 14 | 14 | 14 | 13 | 15 | 14 | 14 | 14 |
| $K_2O$ | 2 | 2 | 2 | 2 | 2 | 3 | 1 | 2 | 2 | 2 |
| $SnO_2$ | 0 | 0 | 0 | 0 | 0 | 0 | 0 | 0 | 0 | 0 |
| $AlPO_4$ equivalent | 14 | 12 | 10 | 14 | | 18 | 18 | 8 | 6 | 4 |
| $BPO_4$ equivalent | | | | | | | | | | |
| $M_2O_3$ | 23 | 22 | 21 | 27 | 23 | 25 | 25 | 20 | 19 | 18 |
| $P_2O_5 + R_2O$ | 23 | 22 | 21 | 23 | 27 | 25 | 25 | 20 | 19 | 18 |
| $(P_2O_5 + R_2O)/M_2O_3$ | 1.00 | 1.00 | 1.00 | 0.85 | 1.17 | 1.00 | 1.00 | 1.00 | 1.00 | 1.00 |
| $(P_2O_5 + R_2O)/Al_2O_3$ | 1.00 | 1.00 | 1.00 | 0.85 | 1.17 | 1.00 | 1.00 | 1.00 | 1.00 | 1.00 |
| Molar Volume ($cm^3$/mol) | 31.52 | 31.36 | 30.7 | 32.3 | 33.42 | 32.91 | 32.62 | 30.04 | 29.38 | 29.15 |
| Pre-IX Vickers Crack Initiation Load (gf) | 1000-2000 | 1000-2000 | 1000-2000 | 1000-2000 | 1000-2000 | 1000-2000 | 1000-2000 | 1000-2000 | 500-1000 | 500-1000 |
| Anneal Pt. (° C.) | 733.3 | 740 | 757 | 794 | 685 | 737 | 741 | 770 | 779 | 789 |
| Strain Pt. (° C.) | 669.3 | 676 | 690 | 725 | 626 | 672 | 678 | 705 | 712 | 722 |
| Temperature at Visc = 35 kP (° C.) | 1303 | 1316 | 1317 | 1312 | 1241 | 1278 | 1275 | 1338 | 1359 | 1377 |
| Temperature Zircon Breakdown (° C.) | | | | | | | | 1135 | 1130 | |
| Liquidus Viscosity (poise) | | 1.75E+09 | | | | | | 1.18E+14 | 3.06E+13 | 6.58E+12 |

| | Sample | | | | | | | | | |
|---|---|---|---|---|---|---|---|---|---|---|
| | 21 | 22 | 23 | 24 | 25 | 26 | 27 | 28 | 29 | 30 |
| | | | | mol % | | | | | | |
| $SiO_2$ | 58 | 60 | 62 | 58 | 60 | 62 | 64 | 58 | 60 | 62 |
| $B_2O_3$ | 4 | 4 | 4 | 5 | 4 | 3 | 2 | 2 | 2 | 2 |
| $Al_2O_3$ | 19 | 18 | 16 | 16 | 16 | 16 | 16 | 20 | 19 | 18 |
| $P_2O_5$ | 3 | 2 | 2 | 5 | 4 | 3 | 2 | 4 | 3 | 2 |
| $Na_2O$ | 14 | 14 | 14 | 14 | 14 | 14 | 14 | 14 | 14 | 14 |
| $K_2O$ | 2 | 2 | 2 | 2 | 2 | 2 | 2 | 2 | 2 | 2 |
| $SnO_2$ | 0 | 0 | 0 | 0 | 0 | 0 | 0 | 0 | 0 | 0 |
| $AlPO_4$ equivalent | 6 | 4 | | | | | | 8 | 6 | 4 |
| $BPO_4$ equivalent | | | 4 | 10 | 8 | 6 | 4 | | | |
| $M_2O_3$ | 23 | 22 | 20 | 21 | 20 | 19 | 18 | 22 | 21 | 20 |
| $P_2O_5 + R_2O$ | 19 | 18 | 18 | 21 | 20 | 19 | 18 | 20 | 19 | 18 |
| $(P_2O_5 + R_2O)/M_2O_3$ | 0.83 | 0.82 | 0.90 | 1.00 | 1.00 | 1.00 | 1.00 | 0.91 | 0.90 | 0.90 |
| $(P_2O_5 + R_2O)/Al_2O_3$ | 1.00 | 1.00 | 1.13 | 1.31 | 1.25 | 1.19 | 1.13 | 1.00 | 1.00 | 1.00 |
| Molar Volume ($cm^3$/mol) | 29.61 | 29.28 | 29.26 | 30.39 | 30.15 | 29.79 | 29.08 | 30.36 | 30.49 | 29.35 |
| Pre-IX Vickers Crack Initiation Load (gf) | 1000-2000 | 1000-2000 | 1000-2000 | 1000-2000 | 1000-2000 | 1000-2000 | 1000-2000 | 1000-2000 | 1000-2000 | 1000-2000 |
| Anneal Pt. (° C.) | 669 | 674 | 649 | 602 | 629 | 666 | 699 | 714 | 717 | 723 |
| Strain Pt. (° C.) | 606 | 609 | 587 | 545 | 569 | 603 | 633 | 649 | 653 | 656 |
| Temperature at Visc = 35 kP (° C.) | 1259 | 1277 | 1273 | 1223 | 1251 | 1293 | 1329 | 1289 | 1309 | 1323 |
| Temperature Zircon Breakdown (° C.) | | | | >1263 | 1225 | 1200 | 1162 | | | |
| Liquidus Viscosity (poise) | 8.04E+08 | 1.17E+09 | | 9.34E+08 | 2.89E+09 | 1.79E+09 | 6.09E+09 | 3.98E+11 | 5.45E+11 | |

| | Sample | | | | | | | | | |
|---|---|---|---|---|---|---|---|---|---|---|
| | 31 | 32 | 33 | 34 | 35 | 36 | 37 | 38 | 39 | 40 |
| | | | | mol % | | | | | | |
| $SiO_2$ | 59 | 61 | 69 | 69 | 62 | 62 | 59.9 | 59.88 | 60 | 62 |
| $B_2O_3$ | 1 | 1 | 3 | 2 | 3 | 3 | 4 | 4 | 4.5 | 4.5 |
| $Al_2O_3$ | 20 | 19 | 12.5 | 13.5 | 15 | 15 | 16 | 18 | 15.5 | 13.5 |
| $P_2O_5$ | 4 | 3 | 3 | 2 | 3 | 3 | 4 | 2 | 4 | 4 |
| $Na_2O$ | 14 | 14 | 12 | 13 | 15 | 14 | 15.5 | 15.5 | 15.5 | 15.5 |
| $K_2O$ | 2 | 2 | 0.5 | 0.5 | 2 | 3 | 0.5 | 0.5 | 0.5 | 0.5 |
| $SnO_2$ | 0 | 0 | 0 | 0 | 0 | 0 | 0.1 | 0.1 | 0 | 0 |
| $AlPO_4$ equivalent | 8 | 6 | | | | | | 4 | | |
| $BPO_4$ equivalent | | | 6 | 4 | | | 8 | 4 | 8 | |
| $M_2O_3$ | 21 | 20 | 15.5 | 15.5 | 18 | 18 | 20 | 22 | 20 | 18 |
| $P_2O_5 + R_2O$ | 20 | 19 | 15.5 | 15.5 | 20 | 20 | 20 | 18 | 20 | 20 |
| $(P_2O_5 + R_2O)/M_2O_3$ | 0.95 | 0.95 | 1.00 | 1.00 | 1.11 | 1.11 | 1.00 | 0.82 | 1.00 | 1.11 |
| $(P_2O_5 + R_2O)/Al_2O_3$ | 1.00 | 1.00 | 1.24 | 1.15 | 1.33 | 1.33 | 1.25 | 1.00 | 1.29 | 1.48 |
| Molar Volume ($cm^3$/mol) | 30.43 | 29.99 | 29.06 | 28.63 | 29.33 | 29.52 | 29.67 | 29.15 | 29.72 | 29.31 |
| Pre-IX Vickers Crack | 1000-2000 | 1000- | 1000-2000 | 1000- | 500-1000 | 500-1000 | 1000-2000 | 1000-2000 | 1000-2000 | 1000- |

TABLE 1-continued

Compositions of phosphorus-containing glasses

| | | | | | | | | | | |
|---|---|---|---|---|---|---|---|---|---|---|
| Initiation Load (gf) | | 2000 | | 2000 | | | | | | 2000 |
| Anneal Pt. (° C.) | 738 | 739 | 656 | 698 | 625 | 639 | 641 | 690 | 616 | 594 |
| Strain Pt. (° C.) | 673 | 673 | 589 | 630 | 569 | 581 | 581 | 627 | 561 | 542 |
| Temperature at Visc = 35 kP (° C.) | 1314 | 1327 | 1346 | 1362 | 1245 | 1260 | 1242 | 1264 | 1223 | 1188 |
| Temperature Zircon Breakdown (° C.) | | | | >1255 | | | 1225 | 1110 | >1258 | |
| Liquidus Viscosity (poise) | 3.48E+12 | | | | | | 5.82E+09 | 3.74E+11 | 4.91E+09 | |

| | Sample | | | | | | | | | |
|---|---|---|---|---|---|---|---|---|---|---|
| | 41 | 42 | 43 | 44 | 45 | 46 | 47 | 48 | 49 | 50 |
| | mol % | | | | | | | | | |
| $SiO_2$ | 62 | 62 | 62 | 58 | 58 | 58 | 58 | 60 | 60 | 60 |
| $B_2O_3$ | 2.5 | 4.5 | 4.5 | 4.5 | 6.5 | 4.5 | 4.5 | 2.5 | 4.5 | 4.5 |
| $Al_2O_3$ | 15.5 | 15.5 | 15.5 | 17.5 | 15.5 | 15.5 | 15.5 | 17.5 | 17.5 | 17.5 |
| $P_2O_5$ | 4 | 2 | 4 | 4 | 4 | 6 | 4 | 4 | 2 | 4 |
| $Na_2O$ | 15.5 | 15.5 | 13.5 | 15.5 | 15.5 | 15.5 | 17.5 | 15.5 | 15.5 | 13.5 |
| $K_2O$ | 0.5 | 0.5 | 0.5 | 0.5 | 0.5 | 0.5 | 0.5 | 0.5 | 0.5 | 0.5 |
| $SnO_2$ | 0 | 0 | 0 | 0 | 0 | 0 | 0 | 0 | 0 | 0 |
| $AlPO_4$ equivalent | | | | | | | | | | |
| $BPO_4$ equivalent | | | | | | | | | | |
| $M_2O_3$ | 18 | 20 | 20 | 22 | 22 | 20 | 20 | 20 | 22 | 22 |
| $P_2O_3 + R_2O$ | 20 | 18 | 18 | 20 | 20 | 22 | 22 | 20 | 18 | 18 |
| $(P_2O_5 + R_2O)/M_2O_3$ | 1.11 | 0.90 | 0.90 | 0.91 | 0.91 | 1.10 | 1.10 | 1.00 | 0.82 | 0.82 |
| $(P_2O_5 + R_2O)/Al_2O_3$ | 1.29 | 1.16 | 1.16 | 1.14 | 1.29 | 1.42 | 1.42 | 1.14 | 1.03 | 1.03 |
| Molar Volume (cm³/mol) | 29.51 | 28.90 | 29.92 | 30.00 | 29.92 | 30.5 | 29.56 | 29.82 | 29.21 | 30.16 |
| Pre-IX Vickers Crack Initiation Load (gf) | 1000-2000 | 1000-2000 | 1000-2000 | 1000-2000 | 1000-2000 | 1000-2000 | 1000-2000 | 500-1000 | 500-1000 | 1000-2000 |
| Anneal Pt. (° C.) | 649 | 633 | 638 | 641 | 588 | 592 | 593 | 679 | 666 | 656 |
| Strain Pt. (° C.) | 590 | 576 | 577 | 582 | 539 | 542 | 547 | 616 | 606 | 594 |
| Temperature at Visc = 35 kP (° C.) | 1277 | 1259 | 1273 | 1240 | 1181.3 | 1195 | 1166 | 1287 | 1259 | 1267 |
| Temperature Zircon Breakdown (° C.) | | | | | | | | | | |
| Liquidus Viscosity (poise) | | | | | | 1.50E+08 | | | | |

| | Sample | | | | | | | | | |
|---|---|---|---|---|---|---|---|---|---|---|
| | 51 | 52 | 53 | 54 | 55 | 56 | 57 | 58 | 59 | 60 |
| | mol % | | | | | | | | | |
| $SiO_2$ | 60 | 60 | 60 | 60 | 60 | 60 | 60 | 60 | 60 | 60 |
| $B_2O_3$ | 6.5 | 6.5 | 2.5 | 2.5 | 4.5 | 4.5 | 4.5 | 4.5 | 4.5 | 4.5 |
| $Al_2O_3$ | 15.5 | 15.5 | 15.5 | 15.5 | 15.5 | 15.5 | 15.4 | 15.4 | 15.4 | 15.4 |
| $P_2O_5$ | 2 | 4 | 6 | 4 | 6 | 2 | 4 | 4 | 3.5 | 4 |
| $Na_2O$ | 15.5 | 13.5 | 15.5 | 17.5 | 13.5 | 17.5 | 15.5 | 16 | 16.5 | 15.5 |
| $K_2O$ | 0.5 | 0.5 | 0.5 | 0.5 | 0.5 | 0.5 | 0.5 | 0 | 0 | 0.5 |
| $SnO_2$ | 0 | 0 | 0 | 0 | 0 | 0 | 0.1 | 0.1 | 0.1 | 0.1 |
| $AlPO_4$ equivalent | | | | | | | | | | |
| $BPO_4$ equivalent | | | | | | | | | | |
| $M_2O_3$ | 22 | 22 | 18 | 18 | 20 | 20 | 19.9 | 19.9 | 19.9 | 19.9 |
| $P_2O_5 + R_2O$ | 18 | 18 | 22 | 22 | 20 | 20 | 20 | 20 | 20 | 20 |
| $(P_2O_5 + R_2O)/M_2O_3$ | 0.82 | 0.82 | 1.22 | 1.22 | 1.00 | 1.00 | 1.01 | 1.01 | 1.01 | 1.01 |
| $(P_2O_5 + R_2O)/Al_2O_3$ | 1.16 | 1.16 | 1.42 | 1.42 | 1.29 | 1.29 | 1.30 | 1.30 | 1.30 | 1.30 |
| Molar Volume (cm³/mol) | 29.14 | 30.09 | 30.28 | 29.28 | 30.67 | 28.79 | 29.63 | 29.56 | 29.30 | 29.63 |
| Pre-IX Vickers Crack Initiation Load (gf) | 1000-2000 | 1000-2000 | 1000-2000 | 500-1000 | 1000-2000 | 500-1000 | 1000-2000 | 1000-2000 | 1000-2000 | 1000-2000 |
| Anneal Pt. (° C.) | 610 | 606 | 630 | 624 | 605 | 623 | 605 | 614 | 613 | 624 |
| Strain Pt. (° C.) | 561 | 547 | 572 | 571 | 547 | 571 | 549 | 559 | 559 | 569 |
| Temperature at Visc = 35 kP (° C.) | 1206 | 1232 | 1246 | 1212 | 1237 | 1217 | 1227 | 1214 | 1211 | 1234 |
| Temperature Zircon Breakdown (° C.) | | | | | | | | | | >1250 |
| Liquidus Viscosity (poise) | 3.33E+09 | | | | | | 9.74E+08 | 3.36E+08 | 1.34E+08 | 2.20E+10 |

| | Sample | | | | |
|---|---|---|---|---|---|
| | 61 | 62 | 63 | 64 | 65 |
| | mol % | | | | |
| $SiO_2$ | 58 | 58.8 | 58.8 | 60 | 60 |
| $B_2O_3$ | 3.75 | 4 | 4 | 4 | 4 |
| $Al_2O_3$ | 16.5 | 16.3 | 16.3 | 15.75 | 15.75 |
| $P_2O_5$ | 3.75 | 4 | 4 | 4 | 4 |
| $Na_2O$ | 18 | 16.4 | 16.9 | 15.75 | 16.25 |
| $K_2O$ | 0 | 0.5 | 0 | 0.5 | 0 |

TABLE 1-continued

Compositions of phosphorus-containing glasses

| | | | | | |
|---|---|---|---|---|---|
| $SnO_2$ | 0 | 0 | 0 | 0 | 0 |
| $AlPO_4$ equivalent | | | | | |
| $BPO_4$ equivalent | | | | | |
| $M_2O_3$ | 20.25 | 20.3 | 20.3 | 19.75 | 19.75 |
| $P_2O_5 + R_2O$ | 21.75 | 20.9 | 20.9 | 20.25 | 20.25 |
| $(P_2O_5 + R_2O)/M_2O_3$ | 1.07 | 1.03 | 1.03 | 1.03 | 1.03 |
| $(P_2O_5 + R_2O)/Al_2O_3$ | 1.32 | 1.28 | 1.28 | 1.29 | 1.29 |
| Molar Volume ($cm^3$/mol) | 29.63 | 29.67 | 29.61 | 29.64 | 29.58 |
| Pre-IX Vickers Crack Initiation Load (gf) | 500-1000 | 1000-2000 | 1000-2000 | 1000-2000 | 1000-2000 |
| Anneal Pt. (° C.) | 644 | 619 | 619 | 617 | 618 |
| Strain Pt. (° C.) | 585 | 565 | 565 | 563 | 563 |
| Temperature at Visc = 35 kP (° C.) | 1258 | 1229 | 1223 | 1235 | 1230 |
| Temperature Zircon Breakdown (° C.) | | | | | |
| Liquidus Viscosity (poise) | 5.29E+09 | | | | |

TABLE 2

Compressive stress, crack initiation load, and abraded ring-on-ring failure loads for phosphate containing glasses ion exchanged at 410° C.
Table II

| | Sample | | | | | | | | | |
|---|---|---|---|---|---|---|---|---|---|---|
| | 1 | 2 | 3 | 4 | 5 | 6 | 7 | 8 | 9 | 10 |
| 410° C. 8 hr ion-exchange on annealed 0.7 mm thick samples | | | | | | | | | | |
| Compressive Stress (MPa) | 645 | 686 | 698 | 665 | 642 | 697 | 732 | 600 | 638 | 692 |
| Depth of Layer (microns) | 60 | 62 | 79 | 49 | 45 | 62 | 67 | 52 | 56 | 78 |
| Vickers Crack Initiation Load (kgf) | >30 | >30 | >30 | >30 | >30 | >30 | >30 | >30 | >30 | >30 |
| Abraded ring-on-ring load at failure (kgf) | >80 | >80 | >90 | >70 | >70 | >100 | >110 | >60 | >70 | >120 |
| 410° C. 2 hr ion-exchange on annealed 0.7 mm thick samples | | | | | | | | | | |
| Compressive Stress (MPa) | | | 711 | | | | | | | |
| Depth of Layer (microns) | | | 35 | | | | | | | |
| Vickers Crack Initiation Load (kgf) | | | >30 | | | | | | | |

| | Sample | | | | | | | | | |
|---|---|---|---|---|---|---|---|---|---|---|
| | 11 | 12 | 13 | 14 | 15 | 16 | 17 | 18 | 19 | 20 |
| 410° C. 8 hr ion-exchange on annealed 0.7 mm thick samples | | | | | | | | | | |
| Compressive Stress (MPa) | 735 | 740 | 724 | 822 | 618 | 643 | 757 | 794 | 811 | 831 |
| Depth of Layer (microns) | 84 | 79 | 80 | 75 | 96 | 82 | 67 | 94 | 100 | 103 |
| Vickers Crack Initiation Load (kgf) | >30 | >30 | >30 | >30 | >30 | >30 | >30 | >20 | >20 | 15-20 |
| Abraded ring-on-ring load at failure (kgf) | >140 | >130 | >130 | >150 | >130 | >110 | >110 | >180 | >190 | >210 |
| 410° C. 2 hr ion-exchange on annealed 0.7 mm thick samples | | | | | | | | | | |
| Compressive Stress (MPa) | 774 | | 817 | | | | | 836 | 838 | 871 |
| Depth of Layer (microns) | 39 | | 42 | | | | | 45 | 50 | 53 |
| Vickers Crack Initiation Load (kgf) | >30 | | >30 | | | | | 25-30 | >20 | >20 |

| | Sample | | | | | | | | | |
|---|---|---|---|---|---|---|---|---|---|---|
| | 21 | 22 | 23 | 24 | 25 | 26 | 27 | 28 | 29 | 30 |
| 410° C. 8 hr ion-exchange on annealed 0.7 mm thick samples | | | | | | | | | | |
| Compressive Stress (MPa) | 833 | 863 | 818 | 675 | 708 | 792 | 848 | 807 | 821 | 862 |
| Depth of Layer (microns) | 66 | 68 | 72 | 76 | 75 | 84 | 91 | 71 | 78 | 79 |
| Vickers Crack Initiation Load (kgf) | >30 | >30 | >30 | >30 | >25 | >25 | <20 | 20-25 | 20-25 | 20-25 |
| Abraded ring-on-ring load at failure (kgf) | >130 | >140 | >140 | >110 | >110 | >160 | >190 | >130 | >150 | >170 |
| 410° C. 2 hr ion-exchange on annealed 0.7 mm thick samples | | | | | | | | | | |
| Compressive Stress (MPa) | 872 | 897 | 880 | | | | | | | |
| Depth of Layer (microns) | 33 | 34 | 38 | | | | | | | |
| Vickers Crack Initiation Load (kgf) | >30 | >30 | >30 | | | | | | | |

TABLE 2-continued

Compressive stress, crack initiation load, and abraded ring-on-ring failure loads for phosphate containing glasses ion exchanged at 410° C.
Table II

| | Sample | | | | | | | | | |
|---|---|---|---|---|---|---|---|---|---|---|
| | 31 | 32 | 33 | 34 | 35 | 36 | 37 | 38 | 39 | 40 |
| 410° C. 8 hr ion-exchange on annealed 0.7 mm thick samples | | | | | | | | | | |
| Compressive Stress (MPa) | 802 | 838 | 657 | 793 | 763 | 763 | 853 | 981 | 740 | 680 |
| Depth of Layer (microns) | 81 | 81 | 69 | 71 | 82 | 78 | 68 | 59 | 66 | 64 |
| Vickers Crack Initiation Load (kgf) | 20-25 | 20-25 | 15-20 | 20-25 | 15-20 | 15-20 | >25 | >30 | >30 | >20 |
| Abraded ring-on-ring load at failure (kgf) | >150 | >160 | >90 | >130 | >140 | >130 | >140 | >160 | >100 | >120 |
| 410° C. 2 hr ion-exchange on annealed 0.7 mm thick samples | | | | | | | | | | |
| Compressive Stress (MPa) | | | | | | | | | | |
| Depth of Layer (microns) | | | | | | | | | | |
| Vickers Crack Initiation Load (kgf) | | | | | | | | | | |

| | Sample | | | | | | | | | |
|---|---|---|---|---|---|---|---|---|---|---|
| | 41 | 42 | 43 | 44 | 45 | 46 | 47 | 48 | 49 | 50 |
| 410° C. 8 hr ion-exchange on annealed 0.7 mm thick samples | | | | | | | | | | |
| Compressive Stress (MPa) | 787 | 882 | 740 | 857 | 728 | 672 | 765 | 892 | 951 | 809 |
| Depth of Layer (microns) | 77 | 59 | 63 | 66 | 56 | 69 | 66 | 74 | 59 | 57 |
| Vickers Crack Initiation Load (kgf) | >20 | >20 | >20 | >20 | >30 | >30 | 20-25 | >20 | >20 | >20 |
| Abraded ring-on-ring load at failure (kgf) | >140 | >130 | >100 | >140 | >80 | >90 | >110 | >170 | >150 | >100 |
| 410° C. 2 hr ion-exchange on annealed 0.7 mm thick samples | | | | | | | | | | |
| Compressive Stress (MPa) | | | | | 822 | 735 | 877 | | | |
| Depth of Layer (microns) | | | | | 28 | 35 | 33 | | | |
| Vickers Crack Initiation Load (kgf) | | | | | >30 | >30 | 20-25 | | | |

| | Sample | | | | | | | | | |
|---|---|---|---|---|---|---|---|---|---|---|
| | 51 | 52 | 53 | 54 | 55 | 56 | 57 | 58 | 59 | 60 |
| 410° C. 8 hr ion-exchange on annealed 0.7 mm thick samples | | | | | | | | | | |
| Compressive Stress (MPa) | 856 | 709 | 690 | 784 | 624 | 852 | 748 | 774 | 793 | 785 |
| Depth of Layer (microns) | 52 | 54 | 78 | 78 | 64 | 58 | 66 | 63 | 61 | 63 |
| Vickers Crack Initiation Load (kgf) | >30 | >20 | >30 | 10-15 | >20 | 10-15 | >30 | >30 | >30 | >30 |
| Abraded ring-on-ring load at failure (kgf) | >100 | >80 | >120 | >140 | >80 | >120 | >110 | >110 | >110 | >110 |
| 410° C. 2 hr ion-exchange on annealed 0.7 mm thick samples | | | | | | | | | | |
| Compressive Stress (MPa) | 948 | | | | | | | | | |
| Depth of Layer (microns) | 27 | | | | | | | | | |
| Vickers Crack Initiation Load (kgf) | >30 | | | | | | | | | |

| | Sample | | | | |
|---|---|---|---|---|---|
| | 61 | 62 | 63 | 64 | 65 |
| 410° C. 8 hr ion-exchange on annealed 0.7 mm thick samples | | | | | |
| Compressive Stress (MPa) | 863 | 796 | 805 | 796 | 787 |
| Depth of Layer (microns) | 64 | 66 | 65 | 65 | 64 |
| Vickers Crack Initiation Load (kgf) | >20 | >20 | >20 | >20 | >20 |
| Abraded ring-on-ring load at failure (kgf) | >130 | >120 | >120 | >120 | >110 |
| 410° C. 2 hr ion-exchange on annealed 0.7 mm thick samples | | | | | |
| Compressive Stress (MPa) | | | | | |
| Depth of Layer (microns) | | | | | |
| Vickers Crack Initiation Load (kgf) | | | | | |

TABLE 3

Compressive stress, crack initiation load, and abraded ring-on-ring failure loads for phosphate containing glasses ion exchanged at 450° C.
Table III

| | Sample | | | | | | | | | |
|---|---|---|---|---|---|---|---|---|---|---|
| | 1 | 2 | 3 | 4 | 5 | 6 | 7 | 8 | 9 | 10 |
| 450° C. 30 min ion-exchange on annealed 0.7 mm thick samples | | | | | | | | | | |
| Compressive Stress (MPa) | | | | | | | | | | |
| Depth of Layer (microns) | | | | | | | | | | |
| Vickers Crack Initiation Load (kgf) | | | | | | | | | | |
| 450° C. 1 hr ion-exchange on annealed 0.7 mm thick samples | | | | | | | | | | |
| Compressive Stress (MPa) | | | | | | | | | | |
| Depth of Layer (microns) | | | | | | | | | | |
| Vickers Crack Initiation Load (kgf) | | | | | | | | | | |

| | Sample | | | | | | | | | |
|---|---|---|---|---|---|---|---|---|---|---|
| | 11 | 12 | 13 | 14 | 15 | 16 | 17 | 18 | 19 | 20 |
| 450° C. 30 min ion-exchange on annealed 0.7 mm thick samples | | | | | | | | | | |
| Compressive Stress (MPa) | | | 794 | | | | | 841 | 843 | 882 |
| Depth of Layer (microns) | | | 41 | | | | | 39 | 40 | 43 |
| Vickers Crack Initiation Load (kgf) | | | >30 | | | | | 25-30 | 20-25 | 15-20 |
| 450° C. 1 hr ion-exchange on annealed 0.7 mm thick samples | | | | | | | | | | |
| Compressive Stress (MPa) | | | 803 | | 767 | | | 846 | 848 | 878 |
| Depth of Layer (microns) | | | 54 | | 36 | | | 54 | 59 | 61 |
| Vickers Crack Initiation Load (kgf) | | | >30 | | >30 | | | >20 | 20-25 | >15 |

| | Sample | | | | | | | | | |
|---|---|---|---|---|---|---|---|---|---|---|
| | 21 | 22 | 23 | 24 | 25 | 26 | 27 | 28 | 29 | 30 |
| 450° C. 30 min ion-exchange on annealed 0.7 mm thick samples | | | | | | | | | | |
| Compressive Stress (MPa) | | | | | | | | 846 | 861 | 916 |
| Depth of Layer (microns) | | | | | | | | 30 | 29 | 32 |
| Vickers Crack Initiation Load (kgf) | | | | | | | | 20-25 | 20-25 | 20-25 |
| 450° C. 1 hr ion-exchange on annealed 0.7 mm thick samples | | | | | | | | | | |
| Compressive Stress (MPa) | 854 | 882 | | 704 | 746 | 832 | 875 | 844 | 854 | 897 |
| Depth of Layer (microns) | 36 | 37 | | 40 | 43 | 44 | 47 | 37 | 40 | 42 |
| Vickers Crack Initiation Load (kgf) | >30 | >30 | | >30 | >30 | >30 | <20 | 20-25 | 20-25 | 20-25 |

| | Sample | | | | | | | | | |
|---|---|---|---|---|---|---|---|---|---|---|
| | 31 | 32 | 33 | 34 | 35 | 36 | 37 | 38 | 39 | 40 |
| 450° C. 30 min ion-exchange on annealed 0.7 mm thick samples | | | | | | | | | | |
| Compressive Stress (MPa) | 836 | 856 | | | | | | | | |
| Depth of Layer (microns) | 32 | 32 | | | | | | | | |
| Vickers Crack Initiation Load (kgf) | 20-25 | 20-25 | | | | | | | | |
| 450° C. 1 hr ion-exchange on annealed 0.7 mm thick samples | | | | | | | | | | |
| Compressive Stress (MPa) | 831 | 852 | 680 | 824 | 810 | 760 | 870 | 1032 | | |
| Depth of Layer (microns) | 42 | 43 | 40 | 42 | 46 | 46 | 39 | 32 | | |
| Vickers Crack Initiation Load (kgf) | 20-25 | 20-25 | 15-20 | 20-25 | 15-20 | 15-20 | >30 | >30 | | |

| | Sample | | | | | | | | | |
|---|---|---|---|---|---|---|---|---|---|---|
| | 41 | 42 | 43 | 44 | 45 | 46 | 47 | 48 | 49 | 50 |
| 450° C. 30 min ion-exchange on annealed 0.7 mm thick samples | | | | | | | | | | |
| Compressive Stress (MPa) | | | | | | | | | | |
| Depth of Layer (microns) | | | | | | | | | | |
| Vickers Crack Initiation Load (kgf) | | | | | | | | | | |
| 450° C. 1 hr ion-exchange on annealed 0.7 mm thick samples | | | | | | | | | | |
| Compressive Stress (MPa) | | | | | 726 | 678 | 787 | | | |
| Depth of Layer (microns) | | | | | 34 | 42 | 41 | | | |
| Vickers Crack Initiation Load (kgf) | | | | | >30 | >30 | 20-25 | | | |

TABLE 3-continued

Compressive stress, crack initiation load, and abraded ring-on-ring failure loads for phosphate containing glasses ion exchanged at 450° C.
Table III

| | Sample | | | | | | | | | |
|---|---|---|---|---|---|---|---|---|---|---|
| | 51 | 52 | 53 | 54 | 55 | 56 | 57 | 58 | 59 | 60 |

450° C. 30 min ion-exchange on annealed 0.7 mm thick samples

| | | | | | | | | | | |
|---|---|---|---|---|---|---|---|---|---|---|
| Compressive Stress (MPa) | | | | | | | | | | |
| Depth of Layer (microns) | | | | | | | | | | |
| Vickers Crack Initiation Load (kgf) | | | | | | | | | | |

450° C. 1 hr ion-exchange on annealed 0.7 mm thick samples

| | | | | | | | | | | |
|---|---|---|---|---|---|---|---|---|---|---|
| Compressive Stress (MPa) | 841 | | | | | | | | | |
| Depth of Layer (microns) | 31 | | | | | | | | | |
| Vickers Crack Initiation Load (kgf) | >30 | | | | | | | | | |

| | Sample | | | | |
|---|---|---|---|---|---|
| | 61 | 62 | 63 | 64 | 65 |

450° C. 30 min ion-exchange on annealed 0.7 mm thick samples

| | | | | | |
|---|---|---|---|---|---|
| Compressive Stress (MPa) | | | | | |
| Depth of Layer (microns) | | | | | |
| Vickers Crack Initiation Load (kgf) | | | | | |

450° C. 1 hr ion-exchange on annealed 0.7 mm thick samples

| | | | | | |
|---|---|---|---|---|---|
| Compressive Stress (MPa) | | | | | |
| Depth of Layer (microns) | | | | | |
| Vickers Crack Initiation Load (kgf) | | | | | |

In another aspect, the phosphate-containing glasses described herein have an anneal point (i.e., the temperature at which the viscosity of the glass is $10^{12.2}$ Pascal seconds (Pa·s) ($10^{13.2}$ poise (P)) of at least about 600° C., in other aspects, at least about 625° C., and in still other aspects, at least about 645° C., which is greater than those of high strength alkali aluminosilicate glasses and alkali aluminoborosilicate glasses. Anneal points for various compositions are listed in Table 1. The higher anneal point of the presently described glasses also reduces stress relaxation of the glass during ion exchange and enables ion exchange at higher temperatures. The higher anneal points also allows ion exchange of these glasses to be carried out at higher temperatures.

In those embodiments where the glass has a 35 kp temperature (i.e., the temperature at which the glass has a viscosity of 3.5 kPa·s (35 kilopoise (kP)) of less than 1300° C., the glasses described herein may be formed glass by down-draw methods that are known in the art, such as, for example, fusion-drawing and slot-drawing. Alternatively, the phosphate-containing glasses described herein can be formed by other methods known in the art such as, but not limited to, crucible melting, rolling, float methods, or the like. In addition to enabling glass formation by down-draw processes, the higher anneal points allows ion exchange of these glasses to be carried out at higher temperatures.

In some embodiments, the phosphate-containing glasses described herein are down-drawable by processes known in the art, such as slot-drawing, fusion drawing, re-drawing, and the like, and has a liquidus viscosity of at least 130 kilopoise In some embodiments, the phosphate-containing glasses described herein have a temperature $T_{35kp}$ at which the glass has a viscosity of 35 kpoise, wherein the temperature $T_{breakdown}$ at which zircon breaks down to form $ZrO_2$ and $SiO_2$ is greater than $T^{35kp}$.

Figure 3:
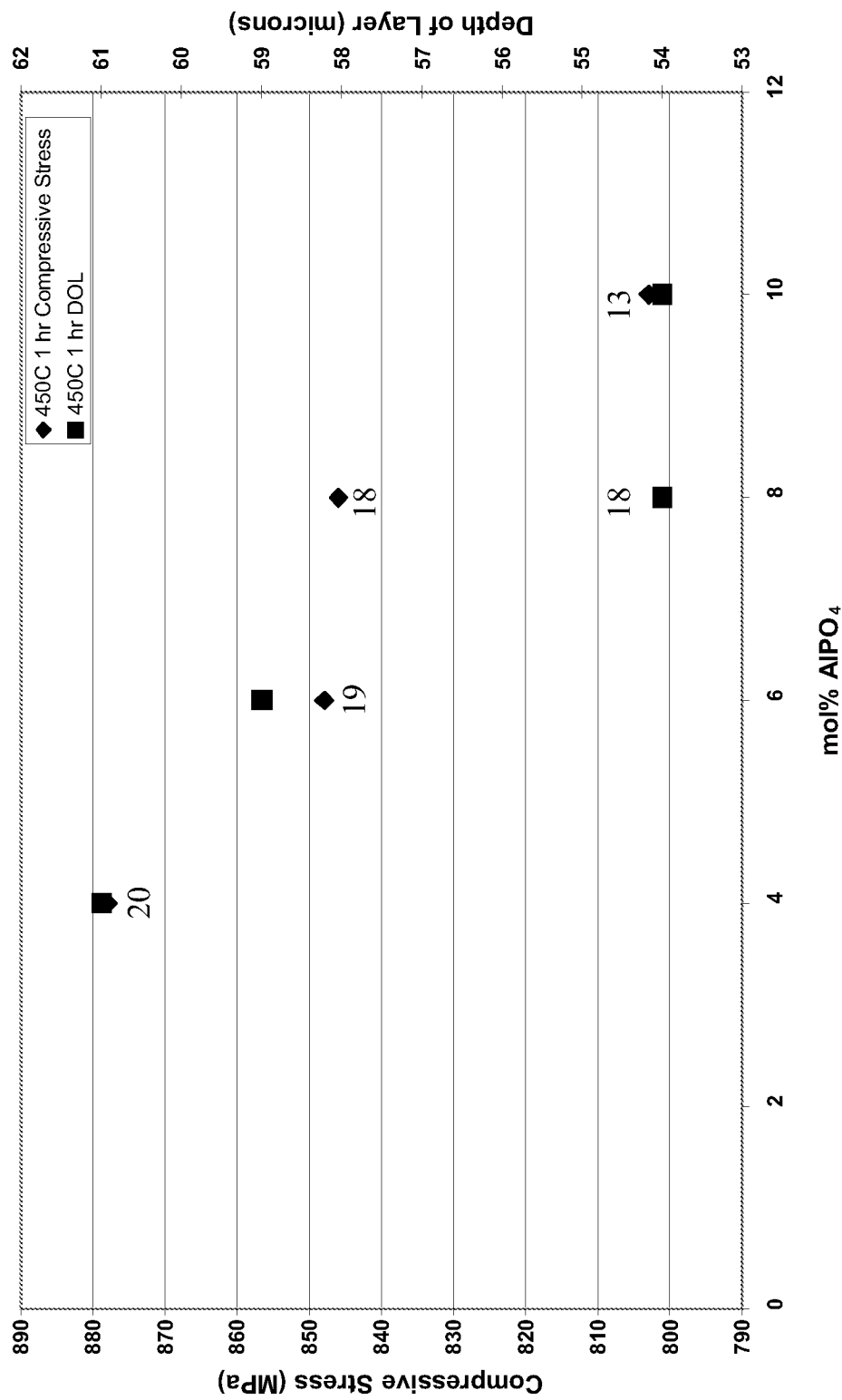
FIG. 3 is a plot of compressive stress and depth of layer as functions of $AlPO_4$ concentration for 0.7 mm thick phosphate-containing glass samples that were ion exchanged in a molten $KNO_3$ salt bath at 450° C. for 1 hour.
Figure 4:
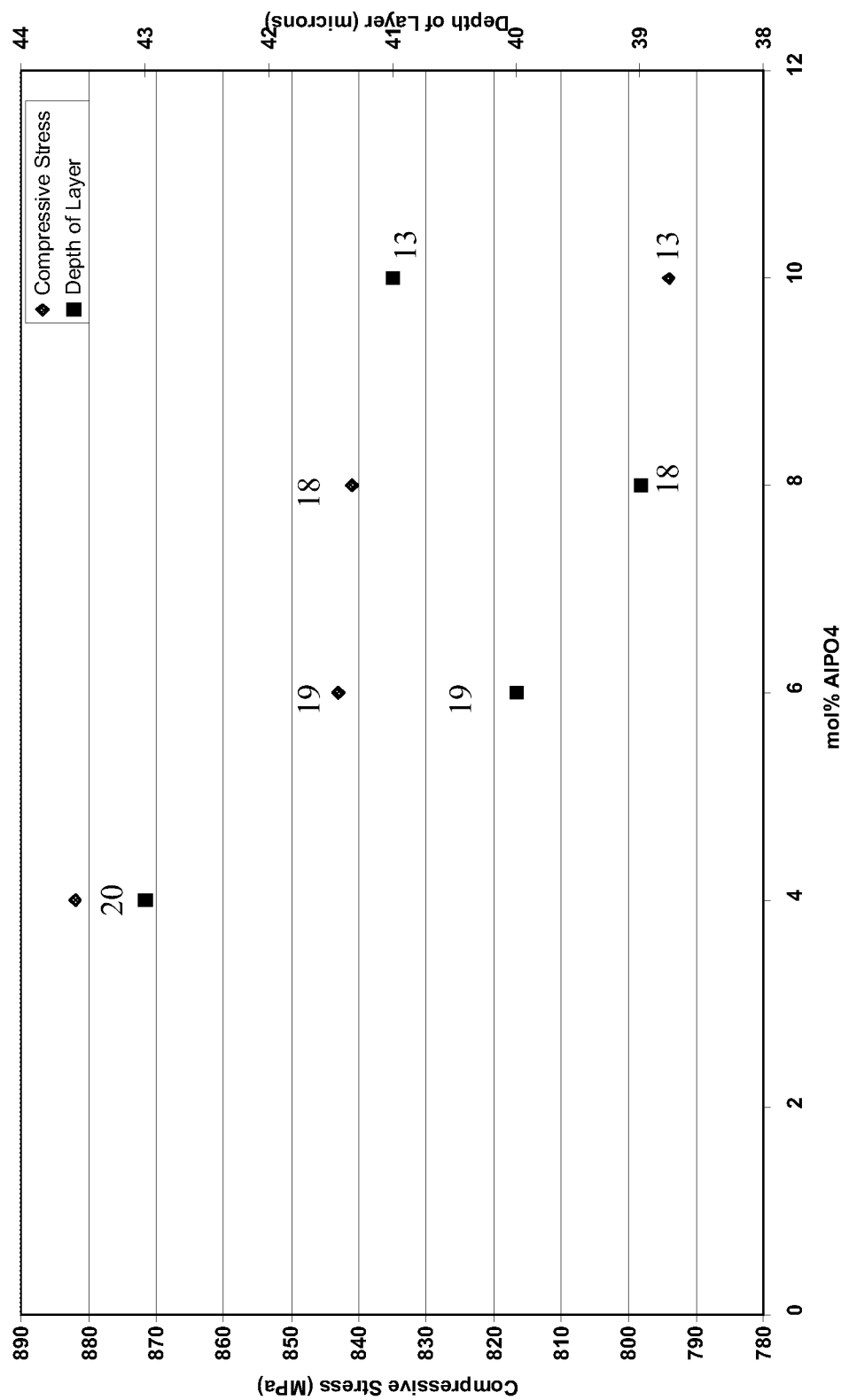
FIG. 4 is a plot of compressive stress and depth of layer as functions of $AlPO_4$ concentration for 0.7 mm thick phosphate-containing glass samples that were ion exchanged in a molten $KNO_3$ salt bath at 450° C. for 30 minutes.

FIG. 3 is a plot of compressive stress and depth of layer as functions of $AlPO_4$ concentration for 0.7 mm thick phosphate-containing glasses (samples 13 and 18-20 in Tables 1-3) phosphate-containing glasses described herein after ion exchange in a molten $KNO_3$ salt bath for 1 hour at 450° C. As seen in FIG. 3, these glasses are capable of ion exchange under the above conditions to a depth of layer of at least 50 μm and a compressive stress of at least 800 MPa. FIG. 4 is a plot of compressive stress and depth of layer as functions of $AlPO_4$ concentration for 0.7 mm thick phosphate-containing glasses described herein (samples 13 and 18-20 in Tables 1-3) after ion exchange in a molten $KNO_3$ salt bath for 30 minutes at 450° C. Compressive stresses and depths of layer obtained by ion exchange in a molten $KNO_3$ salt bath at 450° C. for 30 minutes and 1 hour of the phosphate-containing glasses described herein, as well as Vickers indentation/crack initiation thresholds and abraded ring-on-ring failure loads for these ion exchange glasses, are listed in Table 3.

Figure 5:
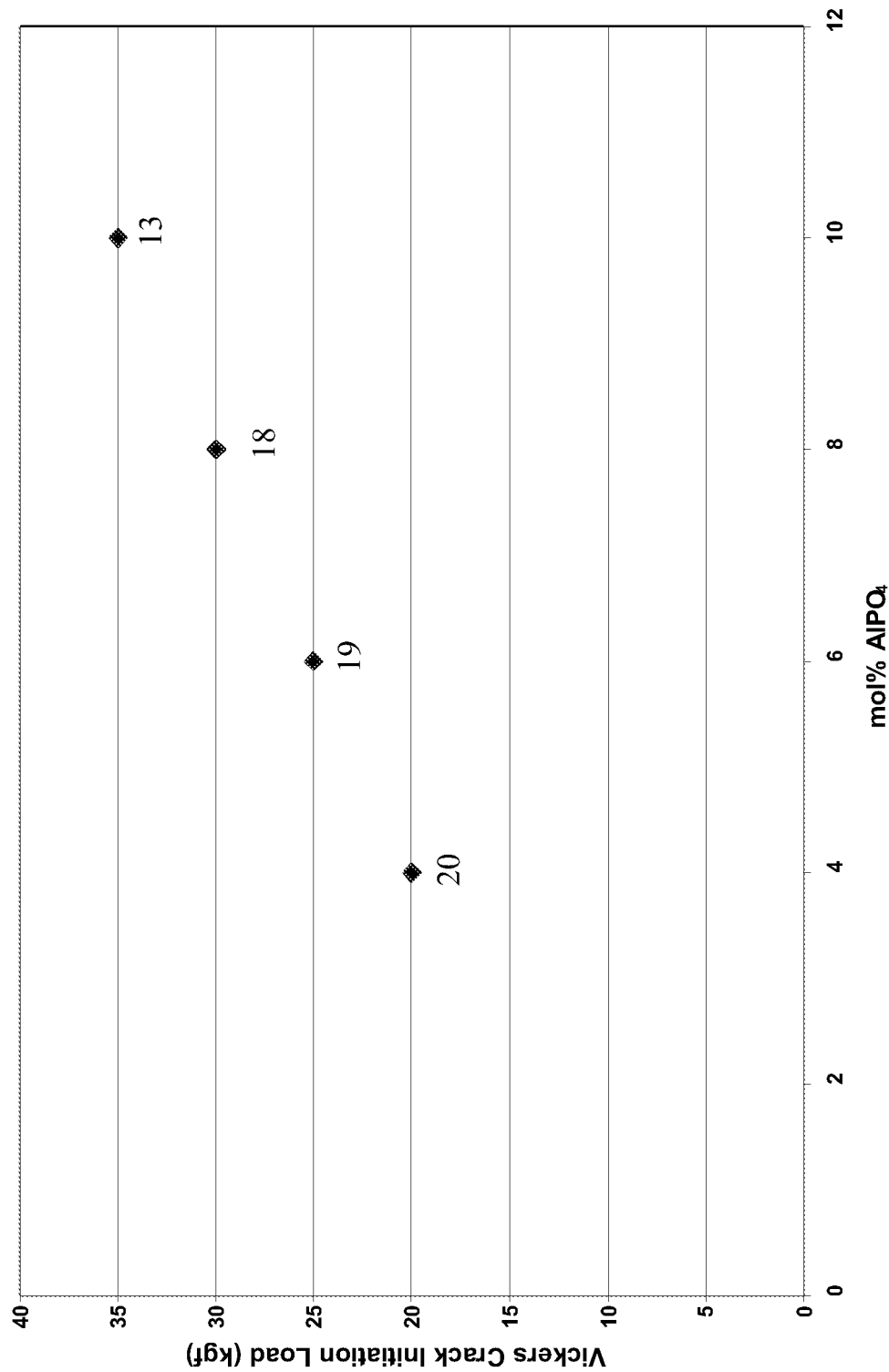
FIG. 5 is a plot of Vickers crack initiation threshold as a function of $AlPO_4$ concentration for boron-free phosphate-containing glasses that were ion exchanged in a molten $KNO_3$ salt bath at 450° C. for 30 minutes.

In one aspect, the phosphate-containing glasses described herein, when chemically strengthened by ion exchange, exhibit a Vickers initiation cracking threshold of at least about 10 kgf (kilogram force), in some embodiments, at least about 20 kgf, in some embodiments and, in other embodiments, at least about 30 kgf. Vickers initiation cracking thresholds measured for 0.7 mm thick phosphate-containing glasses (samples 13 and 18-20 in Table 1) that were ion exchanged in a molten $KNO_3$ salt bath at 450° C. for 30 minutes are plotted as a function of $AlPO_4$ concentration in FIG. 5. Each of the samples for which data are plotted in FIG. 5 do not contain boron and have $(P_2O_5+R_2O)/M_2O_3$ and $(P_2O_5+R_2O)/Al_2O_3$ ratios that are equal to 1. In another aspect, the phosphate-containing glasses described herein, when chemically strengthened by ion exchange, fail at loads of greater than about 80 kgf when subjected to an abraded ring-on-ring load.

The glasses described herein may be used in applications such has, but not limited to: touch screens; protective cover glass for electronic devices such as a hand held communication or entertainment devices, information-related terminals, touch sensor devices, or the like; windshields; appliance enclosures; or architectural elements such as windows, panels, or the like.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass comprising:
   40 to less than 62 mol % $SiO_2$;
   17.5 to 28 mol % $Al_2O_3$;
   1 to 14 mol % $P_2O_5$; and
   at least one alkali metal oxide ($R_2O$), wherein $R_2O$ is selected from the group consisting of $Na_2O$ and $K_2O$, wherein $0.75 \leq [(P_2O_5 \text{ (mol \%)} + R_2O \text{ (mol \%)})/M_2O_3 \text{ (mol \%)}] \leq 1.3$, where $M_2O_3 = Al_2O_3 + B_2O_3$ and the glass is lithium-free.

2. The glass of claim 1, further comprising 12 to 16 mol % $R_2O$.

3. The glass of claim 1, wherein the glass is ion exchanged, and wherein the glass has a Vickers crack initiation threshold of at least 20 kgf.

4. The glass of claim 1, wherein the glass is ion exchanged to a depth of layer of at least 40 μm from a surface of the glass.

5. The glass of claim 1, wherein the glass has an anneal point of at least 600° C.

6. The glass of claim 1, wherein aluminum is present in the glass in the form of tetrahedral aluminum oxide units and phosphorus is present in the glass in the form of tetrahedral phosphorus oxide units.

7. The glass of claim 1, wherein boron is present in the glass in the form of tetrahedral boron oxide units and phosphorus is present in the form of tetrahedral phosphorus oxide units.

8. The glass of claim 1, wherein $B_2O_3 = 0$ mol %.

9. The glass of claim 1, wherein the molar volume of the glass is at least 32 $cm^3$/mol.

* * * * *